350-96,11   SR

XR  3,614,661

United States [11] 3,614,661

| [72] | Inventors | Manfred Borner<br>Ulm (Danube);<br>Gunter Goldbach, Neuenstadt, both of<br>Germany |
|---|---|---|
| [21] | Appl. No. | 746,929 |
| [22] | Filed | July 23, 1968 |
| [45] | Patented | Oct. 19, 1971 |
| [73] | Assignee | Telefunken Patentverwertungsgesellschaft m.b.H.<br>Ulm (Danube), Germany |
| [32] | Priority | July 27, 1967 |
| [33] |  | Germany |
| [31] |  | P 16 14 846.2 |

[54] SEMICONDUCTOR LASER DIODE ARRANGEMENT FOR EXCITING LIGHT-WAVE CONDUCTORS
15 Claims, 10 Drawing Figs.

[52] U.S. Cl. .................................. 331/94.5,
148/187, 317/235 N, 350/96 R, 350/166
[51] Int. Cl. ................................... H01s 3/18
[50] Field of Search............................ 331/94.5;
317/235 (27); 350/166, 96; 313/108 D; 148/187;
250/227

[56] References Cited
UNITED STATES PATENTS

| 3,349,174 | 10/1967 | Warschauer | 331/94.5 X |
|---|---|---|---|
| 3,359,507 | 12/1967 | Hall | 331/94.5 |
| 3,359,509 | 12/1967 | Hall | 331/94.5 |
| 3,361,988 | 1/1968 | Chynoweth | 331/94.5 |
| 3,396,344 | 8/1968 | Broom | 331/94.5 |
| 3,417,246 | 12/1968 | Hall | 331/94.5 X |
| 3,429,733 | 2/1969 | Wolf et al. | 350/166 UX |
| 3,431,437 | 3/1969 | Kosonocky | 331/94.5 X |
| 3,431,512 | 3/1969 | Redfield | 331/94.5 |
| 3,471,923 | 10/1969 | Lamorte et al. | 331/94.5 X |
| 3,492,549 | 1/1970 | Janning | 317/235 (27) |
| 2,379,790 | 7/1945 | Dimmick | 350/166 |
| 2,403,685 | 7/1946 | Sachtleben et al. | 350/166 |
| 2,758,510 | 8/1956 | Auwarter | 350/166 |
| 2,869,010 | 1/1959 | Gray | 350/166 X |
| 3,245,002 | 4/1966 | Hall | 331/94.5 |
| 3,248,670 | 4/1966 | Dill et al. | 331/94.5 |
| 3,283,207 | 11/1966 | Klein | 317/235 (27) X |
| 3,284,722 | 11/1966 | Gray | 331/94.5 |
| 3,289,101 | 11/1966 | Masters et al. | 331/94.5 |
| 3,300,671 | 1/1967 | Woodbury | 313/108 D |
| 3,303,432 | 2/1967 | Garfinkel et al. | 331/94.5 |

*Primary Examiner*—William L. Sikes
*Assistant Examiner*—Edward S. Bauer
*Attorney*—Spencer & Kaye

ABSTRACT: A laser diode semiconductor arrangement in which at least one semiconductor diode is provided on a surface of an insulated supporting body having a reflecting layer and in which such diode includes at least two different types of conductivity zones and a barrier separating such zones, perpendicularly disposed with respect to the reflecting layer surface of the supporting body.

SEMICONDUCTOR LASER DIODE ARRANGEMENT FOR EXCITING LIGHT-WAVE CONDUCTORS

BACKGROUND OF THE INVENTION

The present invention relates to a semiconductor arrangement including at least one diode disposed on a supporting body and having at least two zones of different conductivity types, which zones are separated by a barrier layer and methods for producing the same. The particularly significant feature of the present invention resides in the arrangement of the diode barrier layer to be perpendicularly disposed with respect to the surface of the supporting body on which such diode is supported.

The present invention has particularly advantageous applications when a plurality of spatially separated planar diodes are disposed on a supporting body and when such diodes function as laser diodes and are constructed accordingly.

The laser beam, thanks to its broad bandwidth, provides a practical means for attaining a theoretically ideal transmission carrier and, therefore, has become of more and more interest to the art as an advantageous way of transmitting data. To produce the laser beam required for the transmission of data, laser diodes, also called injection lasers, are particularly suitable. The semiconductor material gallium arsenide (GaAs) is especially suitable for producing laser diodes.

If a planar diode constructed of gallium arsenide is operated in a forward direction, it first emits, at low currents, incoherent infrared light within a relatively narrow spectral range. If the forward current of a GaAs diode is increased beyond a certain value, an induced radiation emission occurs. The intensity of the radiation of the latter is much higher than that of the infrared emission, and the bandwidth of the emitted spectral line is, correspondingly, reduced. In order to produce an induced radiation emission, the diode must be provided with a Fabry-Perot resonator having a natural resonance which lies within the spectral range in which the forced radiation emission is created.

With reference to laser diodes, the generation of coherent light is substantially explained by the presence of recombination junctions of the injected electrons (holes) between the energy level of the line band and the level of the valence band. Other junctions are possible, however, which also produce recombination radiation. Radiation emanates from the vicinity of the barrier layer between the N- and the P-conductive zone of a semiconductor body forming a diode so that the laser beam leaves the diode in a direction which lies in the plane formed by the PN-junction.

It has now been proposed to transmit the light ray emitted by such laser diodes by means of fibrous light-wave conductors. The arrangement necessary for such a transmission includes a laser diode, a fibrous light-wave conductor and a photoelement with which the light ray is transformed again into electrical energy at the receiver site. Fibrous light-wave conductors have the substantial advantage that they can be laid along any desired course, since they have the ability to adapt to practically all types of terrain.

It is known to apply diodes to a supporting body in such a manner that the PN-junction which forms the diode is disposed substantially parallel with the surface of the supporting body. Such an arrangement is highly unsuitable for laser diodes. This applies, particularly, to such cases where a plurality of fibrous light-wave conductors are disposed in a cable and each conductor must be associated with a corresponding laser diode at the transmission site and a photo diode at the receiver site.

SUMMARY OF THE INVENTION

It is, therefore, an object of the present invention to provide a more suitable and improved laser diode arrangement for use in the transmission of data.

According to the present invention, one or a plurality of laser diodes are arranged on at least a partially insulated supporting body. Each diode includes two types of conductive zones, a P-conductive zone and an N-conductive zone. The diodes are arranged in such a manner that the PN-junctions emitting the laser beam extend through the diodes in a direction perpendicular to the surface of the supporting body. The diodes can be associated in a simple manner with fibrous light-wave conductors disposed in a cable. For this purpose, the supporting body is in the form of a plate used as a cable terminal. The laser beam from each diode penetrates the supporting plate and impinges on the end of a corresponding fibrous light-wave conductor, which is thereby excited.

DESCRIPTION OF THE PREFERRED EMBODIMENTS AND METHODS

Figure 1:
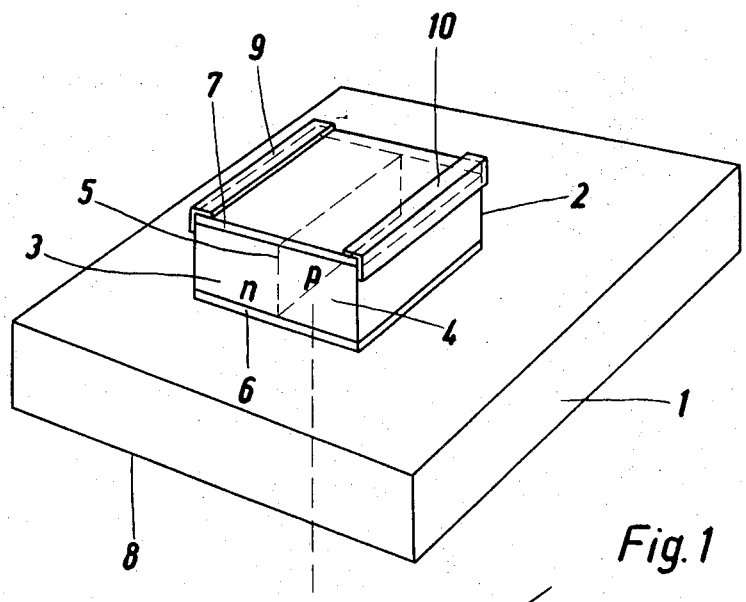
FIG. 1 is a perspective view of a laser diode according to the present invention, disposed on an insulated or semi-insulated supporting body.

FIG. 1 shows a portion of a supporting body 1 on which a single laser diode is disposed. The supporting body consists of an insulating or semi-insulating, light-permeable material. The value of specific resistance of the semi-insulating material is for example $10^6$–$10^8$ Ohm-cm. Highly resistant gallium arsenide (GaAs) or monocrystalline aluminum oxide ($Al_2O_3$), i.e., a sapphire, is particularly suited for this purpose. A semiconductor body or diode 2, including an N-conductive zone 3 and a P-conductive zone 4, is disposed on the supporting body 1. The semiconductor body 2 preferably consists of a compound of semiconductor materials of the IIIrd and the Vth group of the periodic table. Particularly suited for this purpose are, for example, the compounds gallium arsenide and gallium phosphide. In order to provide an effective laser generator, a heavily doped PN-junction is required. Typically, tellurium dopings of $5 \times 10^{17}$ to $3 \times 10^{18}$ impurities per cubic centimeter are provided for the N-conductive side formed of GaAs. In contrast, dopings of up to $5 \times 10^{19}$ impurities per cubic centimeter are provided for the P-conductive side formed of zinc.

The PN-junction 5 which is shown extending through the semiconductor body 2 is planar and perpendicular to the surface of the supporting body 1 on which the diode is disposed. The semiconductor body 2 is provided with layers 6 and 7, one on each of its surfaces which is parallel to the surface of the supporting body 1. Each layer 6 and 7 forms a Fabry-Perot resonator, together with the semiconductor body 2. The Fabry-Perot resonator ensures that radiation of only one phase is emitted from the diode 2. Both parallel layers 6 and 7 have high reflection properties. The light passes many times through the active medium between the two reflecting layers and can, therefore, enter effectively into reciprocal action with the atoms of the active substance. Since light rays whose wave fronts are inclined against the border surface of the resonator leave the system after only a few reflections, the resonator, in practice, resonates only with those light rays whose wave fronts are exactly parallel to the end surfaces of the resonator.

In an advantageous embodiment, the resonator layers 6 and 7 are each provided with a plurality of individual dielectric layers which are not shown individually in FIG. 1. Thus, each layer 6 and 7, for example, includes several, individual layers which are alternatingly arranged between calcium fluoride and glass layers. In this form of the invention, each individual dielectric layer has a different index of refraction. Moreover, it is provided that the thickness of each individual layer is preferably one fourth of the wavelength of the laser beam.

The Fabry-Perot resonator can also be realized by providing that the surface side 8 of the supporting body 1, which faces away from the semiconductor body 2, and the surface side of the semiconductor body 2, which faces away from the supporting body 1, are coated with reflecting layers. Thus, the supporting body 1 is incorporated into the resonator so that the length of the resonator is artificially increased. According to another possible approach, the surface sides of the semiconductor body 2 itself can provide the resonator border surfaces, if the PN-junction lies in a 100 plane crystal lattice. This is so because the 110-planes perpendicular to the PN-junction which then form the Fabry-Perot resonator, represent the natural cleavage areas for GaAs and other compounds taken from Groups III and V of the Periodic Table.

The two zones 3 and 4 of the semiconductor body 2 are provided with ohmic contacts 9 and 10 through which the semiconductor body or diode 2 is provided with current in such a manner that this current flows through the diode in a forward direction to produce a laser beam.

Figure 2:
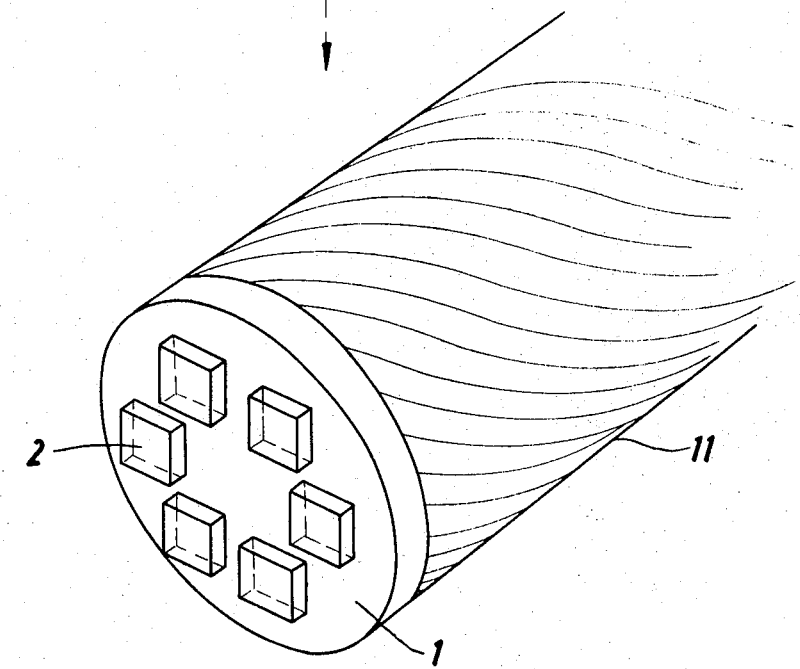
FIG. 2 is a perspective view of a portion of a light-wave conducting cable including a supporting plate having a plurality of laser diodes according to the present invention.
Figure 3:
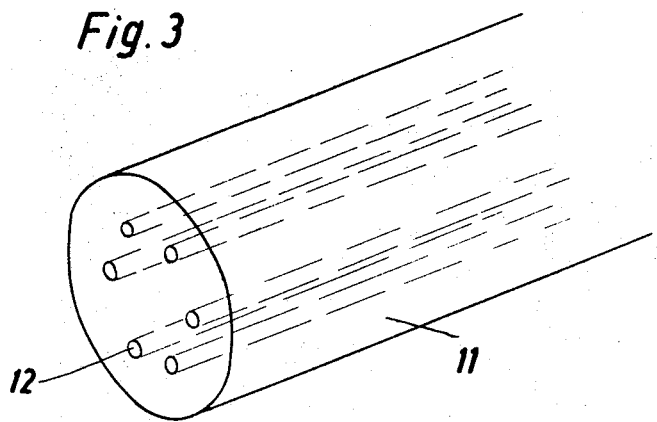
FIG. 3 is a perspective view of a portion of a cable having a plurality of individual light-wave conductors.

FIG. 2 shows how the supporting body 1 can be in the form of a disc-shaped supporting plate which can be combined in an advantageous manner with the light conductor cable 11. The light conductor cable 11, there shown, includes a plurality of fibrous light-wave conductors 12 as shown in FIG. 3 which are formed, for example, of glass or quartz and each of which has a diameter of several $\mu$m. The light-wave conductors 12 are surrounded by a material which is impermeable to light or are constructed, in a known manner, as dielectric multiple-layer waveguides.

FIG. 3 shows the ends of conductors 12 of the cable 11. A supporting plate 1 containing a plurality of semiconductor bodies or laser diodes 2 is applied in a manner similar to that shown in FIG. 2, that is, one fibrous light-wave conductor 12 is correspondingly associated with a PN-junction of the diodes 2. The laser beam emitted by each PN-junction impinges on a corresponding conductor 12, thus optimally exciting it. At the opposite end of the cable 11 (not shown in FIGS. 2 and 3), another plate corresponding to the supporting plate 1 is appropriately connected thereto and bears the receiving photo diodes. When the laser beam, as this has thus far been presupposed, impinges on the light-wave conductors 12 through the supporting plate 1, the layer 6 of the Fabry-Perot resonator disposed on the supporting plate must not be entirely reflecting. Instead, the laser beam must be able to leave the resonator after the occurrence of a definite number of reflections. In this case, the other layer 7 of the resonator consists of a 100 percent reflecting material. The reflection factors of the Fabry-Perot resonator layers can, however, also be reversed when the laser beam is intended to exit on the surface side of the semiconductor body 2, which faces away from the supporting body 1. Then, of course, the light-wave conductor 12 would also have to be coupled to the PN-junction of the diode at this surface side of the semiconductor body 1.

Figure 4:
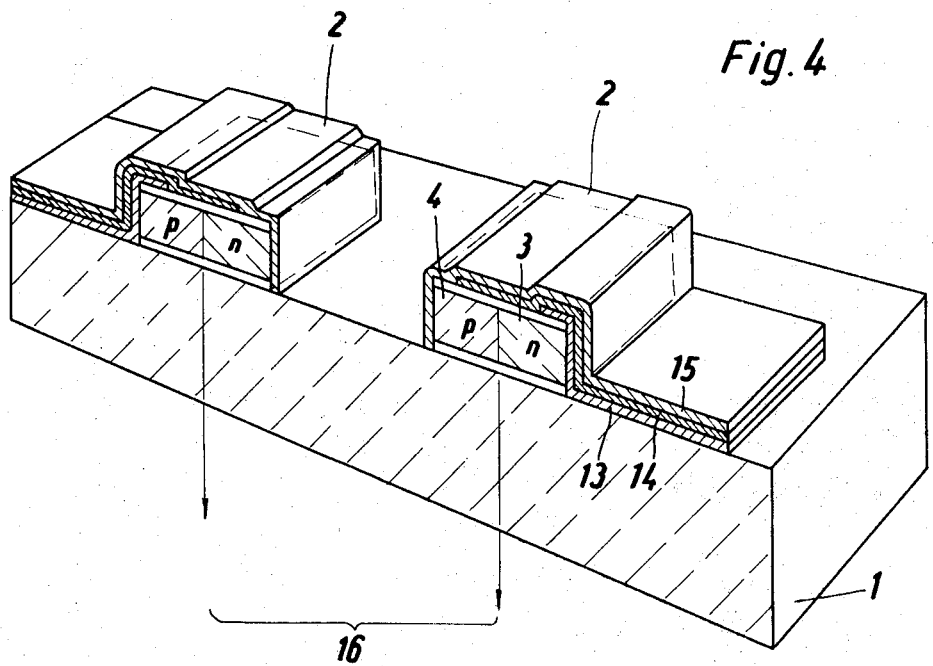
FIG. 4 is a perspective view of the particularly advantageous manner in which the laser diodes can be contacted and provided with electrical connections.

FIG. 4 shows an advantageous means for contacting the laser diodes. Two cube-shaped laser diodes or semiconductor bodies 2 are shown on a portion of the supporting body 1, each having an N-conductive and a P-conductive zone, 3 and 4, respectively. The N-conductive zone 3 is ohmically contacted by a metallic electrode on the surface side of the semiconductor body 2 which faces away from the supporting body 1. This electrode has the form of a planar conductive path 13, which extends not only across the surface of the semiconductor body 2 facing away from supporting body 1, but along the lateral surfaces of zone 3 to the supporting body 1 as well. On this first conductive path there is a dielectric layer 14 which, additionally, covers the PN-junction on the semiconductor surface. On the dielectric layer 14 there is provided a conductive path 15 which contacts the P-conductive zone 4 and also contacts the lateral surfaces of zone 4 which are perpendicular to the surface of supporting body 1. With this construction of conductive paths a band line structure is produced at the edge of the supporting plate 1 which allows for controlling the diodes 2 up to a very high range of frequencies (gigahertz range). Arrows 16 in FIG. 4 indicate the exit direction of the laser beams through the supporting plate 1.

Figure 5:
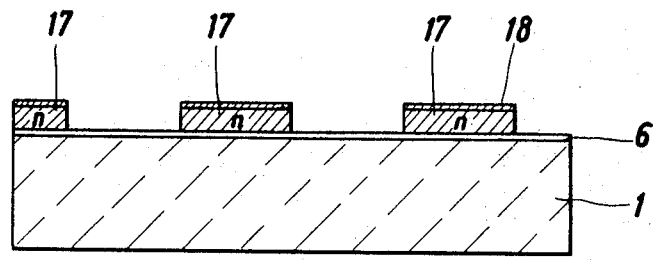
FIGS. 5 to 7 illustrate the steps of a method for producing a semiconductor arrangement having a plurality of laser diodes on a supporting body, according to the invention.
Figure 6:
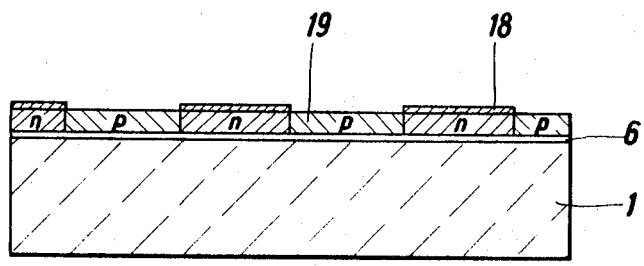
Figure 7:
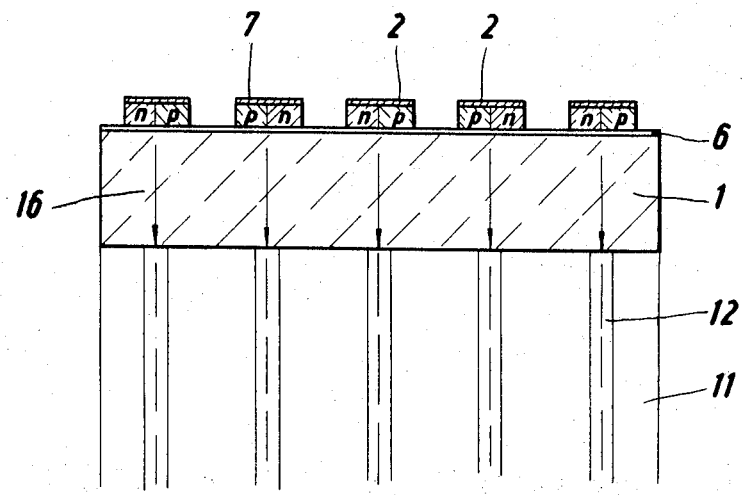

The sectional views shown in FIGS. 5 through 7 illustrate a first method for producing the laser diode arrangement according to the present invention. Referring first to FIG. 5, a first dielectric resonator layer 6 is applied to a supporting body 1. Such a layer may include a plurality of individual layers. Spatially separated N-conductive semiconductor regions 17 are applied onto this layer 6, e.g., epitaxially and with the use of vapor-deposition masks. These semiconductor regions are covered on their surfaces with an amorphous protective layer 18, for example of silicon dioxide. It may also be provided that instead of applying the semiconductor regions 17 in a spatially separated manner, the semiconductor material forming the same can be applied as a continuous layer. The protective layer 18 can then be applied to such layer of semiconductor material and subsequently thereto, portions of the semiconductor layer together with protective layer 18 can be removed to define spatially separated N-conductive regions 17. Subsequently, the free portions of the supporting body 1 or spaces disposed between the N-conductive semiconductor regions 17 are filled with a P-conductive semiconductor material 19, as shown in FIG. 6. This latter step is suitably accomplished by epitaxial deposition, since the amorphous protective layer 18 prevents an undesirable deposition from occurring on the N-conductive semiconductor regions 17. Thereafter, the now coherent semiconductor layer consisting of alternating N- and P-conductive type zones, as shown in FIG. 7, is subdivided by sawing, cutting or etching so that spatially separated semiconductor bodies or regions 2, each having one N- and one P-conductive region, result. The PN-junction in each semiconductor region 2 is disposed perpendicularly to the layer 6 and the surface of the supporting body 1 and the laser beam coming from the PN-junction impinges on a correspondingly associated light-wave conductor 12 carried by the cable 11 coupled to such supporting body or plate 1. On the surface of the individual diodes the insulating layer 18 is then displaced by a second resonator layer 7 and the individual conductivity zones of the diodes are provided with ohmic contacts which are extended into conductive paths and which are preferably vapor-deposited.

Figure 8:
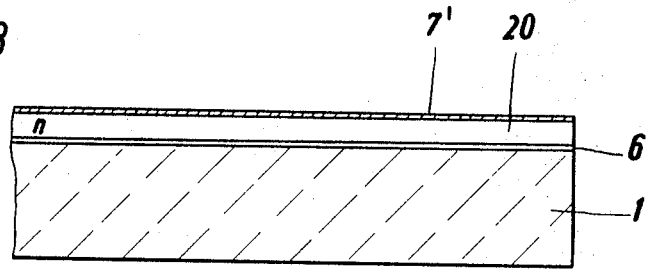
FIGS. 8 to 10 illustrate the steps of another method for producing a semiconductor arrangement having a plurality of laser diodes on a supporting body, according to the invention.
Figure 9:
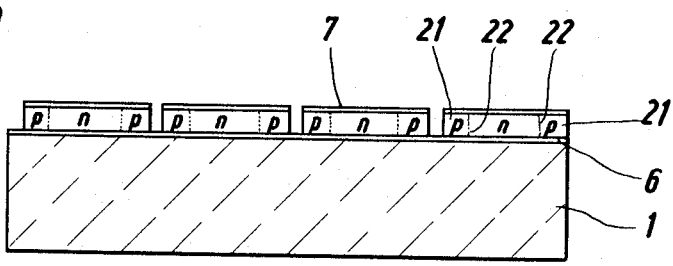
Figure 10:
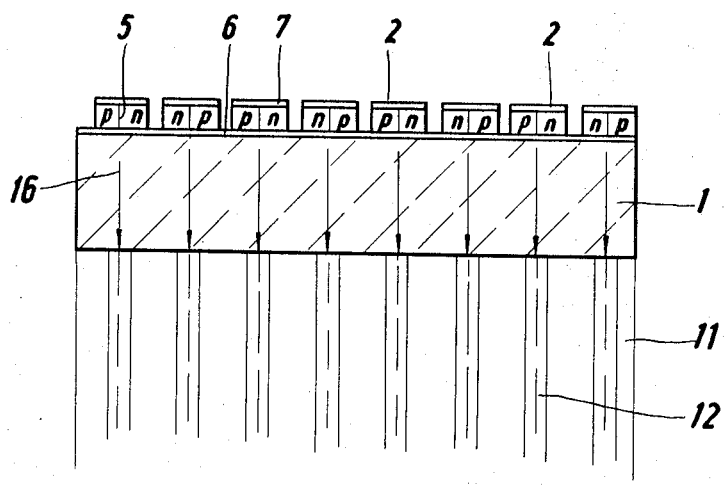

A second method for producing a laser diode arrangement according to the present invention is illustrated in the sectional views of FIGS. 8 to 10. A first dielectric resonator layer 6 is applied to a supporting body 1. Thereafter an N-conductive semiconductor layer 20, for example, whose area corresponds to that of the supporting body 1 is epitaxially deposited onto the resonator layer 6. By the formation of another resonator layer 7 on the semiconductor layer 20 the vapor-deposition or precipitation processes are completed. However, prior to the forming of layer 7 the layer 20 is covered with a layer of diffusion inhibiting material 7'. Thereafter a raster-shaped structure must be etched or sawed out of the semiconductor layer 20 in such a manner that individual N-conductive semiconductor regions are created. If it is provided that the exposed material of the resonator layers 6 and 7 and of the supporting body 1 is impermeable to a doping substance, which would cause P-conduction in the semiconductor body 1, then the subsequent lateral diffusion of such impurity-causing doping substance into the semiconductor layer 20 will create P-conductive zones 21. The zones 21 are separated from the original N-conductive semiconductor material of layer 20 by barriers or PN-junctions 22 which extend perpendicularly to the surface of the supporting body 1, as shown in FIG. 9. Now the only further step required is an etching or sawing operation to produce individual semiconductor regions 2 consisting each of two types of conductivity zones separated by a PN-junction on the supporting body surface, as shown in FIG. 10. The diffusion, etching or sawing operations are so controlled that the PN-junction 5 of each diode is disposed opposite a light-wave conductor 12 in the cable 11 coupled to the supporting body or plate 1. This is done in such a manner that the light-wave conductor is optimally excited by a laser beam 16 emanating from the diode.

It is significant, in the present semiconductor arrangement, that a plurality of laser diodes can be accommodated on a supporting body by utilizing the known advantages of the planar technique, and that the emitted laser radiation of each diode excites one corresponding light-wave conductor of an arbitrary number of closely packed light-wave conductors within a cable. Thus it is possible to transmit spatially separated data on individual, adjacent channels.

The use of planar semiconductor diodes whose PN-junctions are disposed perpendicularly to the surface of the supporting body holding the diode is not limited only to laser diodes but can also be applied advantageously for photo or luminescent diodes.

The production of the described laser arrangement is of course not limited to the above-mentioned processes. It is, for example, also possible to make individually produced diodes, having planar PN-junctions, to adhere to a supporting body in such a manner that the PN-junctions come to lie perpendicularly to the supporting body surface.

It will be understood that the above description of the present invention is susceptible to various modifications, changes and adaptations.

We claim:

1. A semiconductor laser diode arrangement for exciting light-wave conductors comprising in combination:
    a supporting body formed of a material which is at least partially electrically insulating;
    a plurality of semiconductor laser diodes disposed in spaced-apart relationship on a surface of said supporting body, each of said diodes including at least two opposite conductivity type zones separated by a PN-junction barrier layer, said diodes being oriented on said supporting body surface so that said barrier layer is perpendicular to said supporting body surface; and,
    reflecting layers provided on the surface sides of the diodes facing away from the supporting body and on the surface side of the supporting body facing away from the diodes, said reflecting layers forming Fabry-Perot resonators with said diodes and the supporting body.

2. Semiconductor arrangement as defined in claim 1 wherein said reflecting layers are perpendicularly disposed with respect to said barrier layer.

3. Semiconductor arrangement as defined in claim 2 wherein said reflecting layers include a plurality of layers.

4. A semiconductor laser diode arrangement for exciting light-wave conductors comprising in combination:
    a supporting body formed of a material which is at least partially electrically insulating;
    a plurality of semiconductor laser diodes disposed in spaced-apart relationship on a surface of said supporting body, each of said diodes including at least two opposite conductivity type zones separated by a PN-junction barrier layer, said diodes being oriented on said supporting body surface so that said barrier layer is perpendicular to said supporting surface;
    each of said opposite conductivity type zones of each diode being provided with an electrical contact element which is connected to an electrical conductive path provided on said surface of said supporting body;
    each of said diodes being associated with a corresponding light-wave conductor, the PN-junction of each of said diodes being disposed on the supporting body and arranged with respect to its corresponding light-wave conductor to channel the laser beam emitted by the PN-junction through the supporting body where it impinges on a light-wave conductor associated with the respective diode as a consequence of which the light-wave conductor is excited by such laser beam.

5. Semiconductor arrangement as defined in claim 4 wherein said diodes include light-reflecting, Fabry-Perot resonators on their surface sides which are perpendicularly disposed with respect to said barrier layer.

6. Semiconductor arrangement as defined in claim 5 wherein said resonators each include a plurality of layers.

7. Semiconductor arrangement as defined in claim 4 wherein the diodes are formed of a compound of semiconductor materials taken from the IIIrd and Vth groups of the Periodic Table.

8. Semiconductor arrangement as defined in claim 7 wherein the compound forming the diodes is taken from the group consisting of gallium arsenide and gallium phosphide.

9. Semiconductor arrangement as defined in claim 8 wherein the diodes consist of epitaxially applied semiconductor material.

10. Semiconductor arrangement as defined in claim 7 wherein the supporting body is formed of a compound taken from the group consisting of highly resistant gallium arsenide and monocrystalline aluminum oxide.

11. Semiconductor arrangement as defined in claim 4 wherein said zones include a P-conductive zone and an N-conductive zone, the conductive path disposed on the supporting body for one of said zones being disposed above the conductive path for the other of said zones, both conductive paths being separated from each other by an intermediate dielectric layer.

12. A semiconductor laser diode arrangement for exciting light-wave conductors comprising in combination:
    a supporting body formed of a material which is at least partially electrically insulating;
    a plurality of semiconductor laser diodes disposed in spaced apart relationship on a surface of said supporting body, each of said diodes including at least two opposite conductivity type zones separated by a PN-junction barrier layer, said diodes being oriented on said supporting body surface so that said barrier layer is perpendicular to said supporting body surface;
    each of said opposite conductivity type zones of each of said diodes being provided with a metallic contact element on the surface side of the diodes facing away from said supporting body; and
    each of said contact elements is connected with an electrical conductive path provided on said surface of said supporting body.

13. The semiconductor arrangement as defined in claim 12 wherein the conductive path disposed on said surface of said supporting body for one of said zones of each diode is disposed above the conductive path for the other of said zones for the respective diode with both conductive paths being separated from one another by an intermediate dielectric layer.

14. A semiconductor laser diode arrangement for exciting light-wave conductors comprising in combination:
    a supporting body formed of a material which is at least partially electrically insulating;
    a plurality of semiconductor laser diodes disposed in spaced-apart relationship on a surface of said supporting body, each of said diodes including at least two opposite conductivity-type zones separated by a PN-junction barrier layer, said diodes being oriented on said supporting body surface so that said barrier layer is perpendicular to said supporting body surface;
    each of said opposite conductivity type zones of each of said diodes being provided with a metallic contact element located on the respective lateral surfaces of said diodes which extend perpendicularly to said surface of said supporting body; and
    each of said contact elements is connected to an electrical conductive path provided on said surface of said supporting body.

15. The semiconductor arrangement as defined in claim 14 wherein the conductive path disposed on said surface supporting body for one of said zones of each diode is disposed above the conductive path for the other of said zones for the respective diode with both conductive paths being separated from one another by an intermediate dielectric layer.

UNITED STATES PATENT OFFICE
CERTIFICATE OF CORRECTION

Patent No. 3,614,661          Dated October 19, 1971

Inventor(s) Manfred Borner et al.

It is certified that error appears in the above-identified patent and that said Letters Patent are hereby corrected as shown below:

On the cover sheet [32], "July 27, 1967" should read -- July 26, 1967 --.

Signed and sealed this 12th day of September 1972.

(SEAL)
Attest:

EDWARD M. FLETCHER, JR.
Attesting Officer

ROBERT GOTTSCHALK
Commissioner of Patents